(12) United States Patent
Desai

(10) Patent No.: US 12,105,627 B2
(45) Date of Patent: Oct. 1, 2024

(54) METHODS FOR CACHE INSERTION USING GHOST LISTS

(71) Applicant: Dell Products L.P., Round Rock, TX (US)

(72) Inventor: Keyur B. Desai, Cary, NC (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/650,415

(22) Filed: Feb. 9, 2022

(65) Prior Publication Data

US 2023/0251966 A1 Aug. 10, 2023

(51) Int. Cl.
G06F 12/00 (2006.01)
G06F 12/0802 (2016.01)

(52) U.S. Cl.
CPC ...... G06F 12/0802 (2013.01); *G06F 2212/60* (2013.01)

(58) Field of Classification Search
CPC .......... G06F 12/0802; G06F 2212/60
See application file for complete search history.

(56) References Cited

U.S. PATENT DOCUMENTS

| | | |
|---|---|---|
| 8,713,261 B1 | 4/2014 | Aharoni et al. |
| 8,924,647 B1 | 12/2014 | Evans |
| 9,569,367 B1 | 2/2017 | Wigmore et al. |
| 9,582,421 B1 | 2/2017 | Agarwala et al. |
| 9,921,963 B1 | 3/2018 | Li et al. |
| 9,990,301 B1 | 6/2018 | Kanaujia et al. |
| 11,599,462 B1* | 3/2023 | Hawkins ............. G06F 12/0802 |
| 2006/0143393 A1 | 6/2006 | Petev et al. |
| 2008/0059707 A1 | 3/2008 | Makineni et al. |
| 2012/0137081 A1 | 5/2012 | Shea |
| 2012/0221774 A1 | 8/2012 | Atkisson et al. |
| 2013/0227218 A1 | 8/2013 | Chang et al. |
| 2014/0115244 A1 | 4/2014 | Maybee et al. |
| 2016/0062916 A1 | 3/2016 | Das et al. |
| 2017/0031823 A1* | 2/2017 | Ross ................... G06F 12/0862 |
| 2017/0235681 A1 | 8/2017 | Kaburaki et al. |
| 2017/0329720 A1 | 11/2017 | Bedi et al. |
| 2018/0275899 A1 | 9/2018 | Munsil et al. |
| 2020/0213627 A1 | 7/2020 | Ra et al. |
| 2020/0225868 A1* | 7/2020 | Dalmatov ........... G06F 12/0873 |
| 2021/0263862 A1 | 8/2021 | Gupta et al. |

OTHER PUBLICATIONS

John L. Hennessy and David A. Patterson, Computer Architecture: A Quantitative Approach, 2019, Morgan Kaufmann, Sixth Edition, Appendix pp. B13 and B39 (Year: 2019).

* cited by examiner

*Primary Examiner* — Shawn X Gu
(74) *Attorney, Agent, or Firm* — Workman Nydegger

(57) ABSTRACT

A reverse cache for inserting data into a main cache is disclosed. The reverse cache is configured to identify candidates for insertion into a main cache. The reverse cache stores entries such as fingerprints and index values, which are representations of or that identify data. When the entry has been accessed multiple times or is a candidate for promotion based on operation of the reverse cache, data corresponding to the entry is promoted to the main cache.

18 Claims, 7 Drawing Sheets

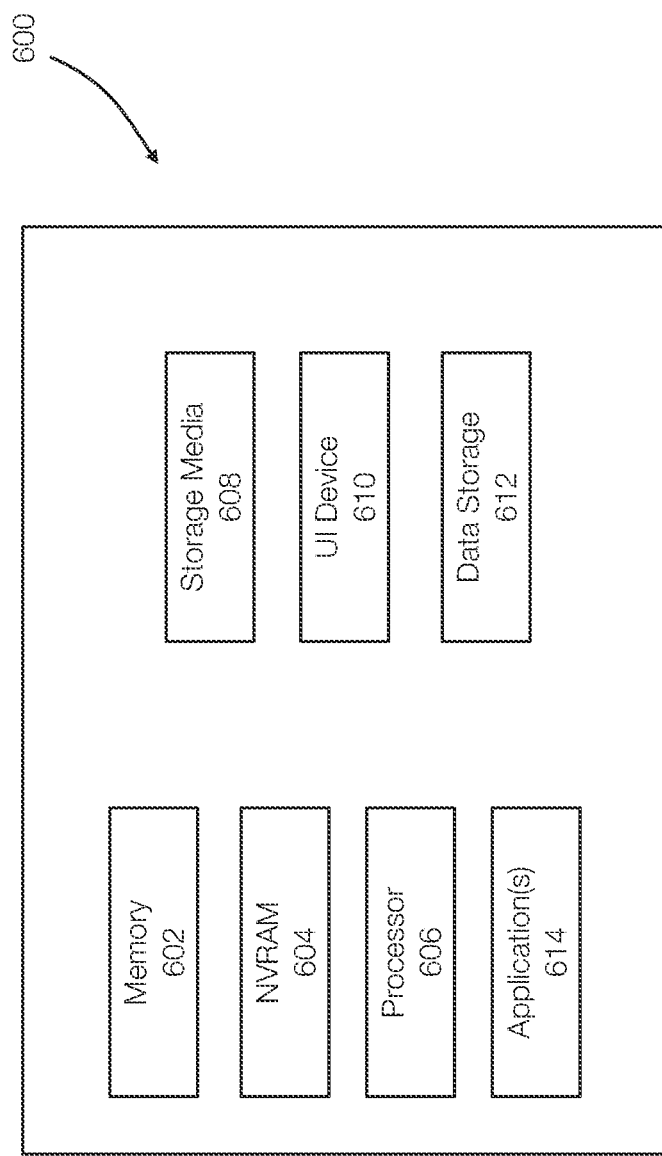

METHODS FOR CACHE INSERTION USING GHOST LISTS

FIELD OF THE INVENTION

Embodiments of the present invention generally relate to caching in computing systems. More particularly, at least some embodiments of the invention relate to systems, hardware, software, computer-readable media, and methods for inserting data into caches in computing systems.

BACKGROUND

In computing systems, data is often stored on a storage device such as a hard drive. When data is needed, the hard drive is accessed to retrieve and use the data. In order to improve this process, a cache may be used. A cache is typically implemented in a memory that is faster than the hard drive. Data from the hard drive can be cached in the cache and accessed more quickly. As a result, the cache tends to improve the performance of computing system at least by avoiding the need to access the hard drive when the data is cached.

The size of the cache, however, is usually limited or fixed in size and is typically smaller than the hard drive. As a result, some of the data needed by an application may not be present in the cache, resulting in a cache miss. To improve performance and improve a cache hit ratio, there is a desire to store data that will be accessed from the cache. For example, it may be more useful to cache data that is used or accessed several times compared to caching data that is only used once or twice. Conventionally, this is achieved using various eviction policies. Generally, the goal of eviction policies is to evict data that is accessed less frequently than other data in the cache.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 6 discloses aspects of a computing device or a computing system.

DETAILED DESCRIPTION OF SOME EXAMPLE EMBODIMENTS

Embodiments of the present invention generally relate to caches, caching systems and caching operations. More particularly, at least some embodiments of the invention relate to systems, hardware, software, computer-readable media, and methods for caching operations including cache entry operations, cache management operations, cache control operations, cache insertion operations and/or cache eviction operations.

Effective cache insertion operations can improve the performance of a cache, applications that use the cache, and the operation of the computing system. Embodiments of the invention relate to caching operations such that items that are most recently used and/or most frequently used are inserted into the cache. By inserting data into the cache in a more considered manner, the data in the cache is more likely to be accessed and, as a result, a cache hit ratio is improved, thereby improving performance of the computing system.

Embodiments of the invention relate to a reverse cache that is described in the context of various caching methodologies including methodologies based on frequency such as least frequently used (LFU) and methodologies based on recency such as least recently used (LRU). By way of example and without limitation, recency refers to when an entry was accessed relative to other entries, and frequency refers to how many times an entry has been accessed. Frequency may also include aspects of recency.

Embodiments of the invention are also disclosed in the context of an adaptive replacement cache (ARC). ARC is a method of cache management that uses both recency and frequency. Prior to describing the operation of a reverse cache, the operation of an example cache that includes aspects of embodiments of the invention is disclosed.

Figure 1A:
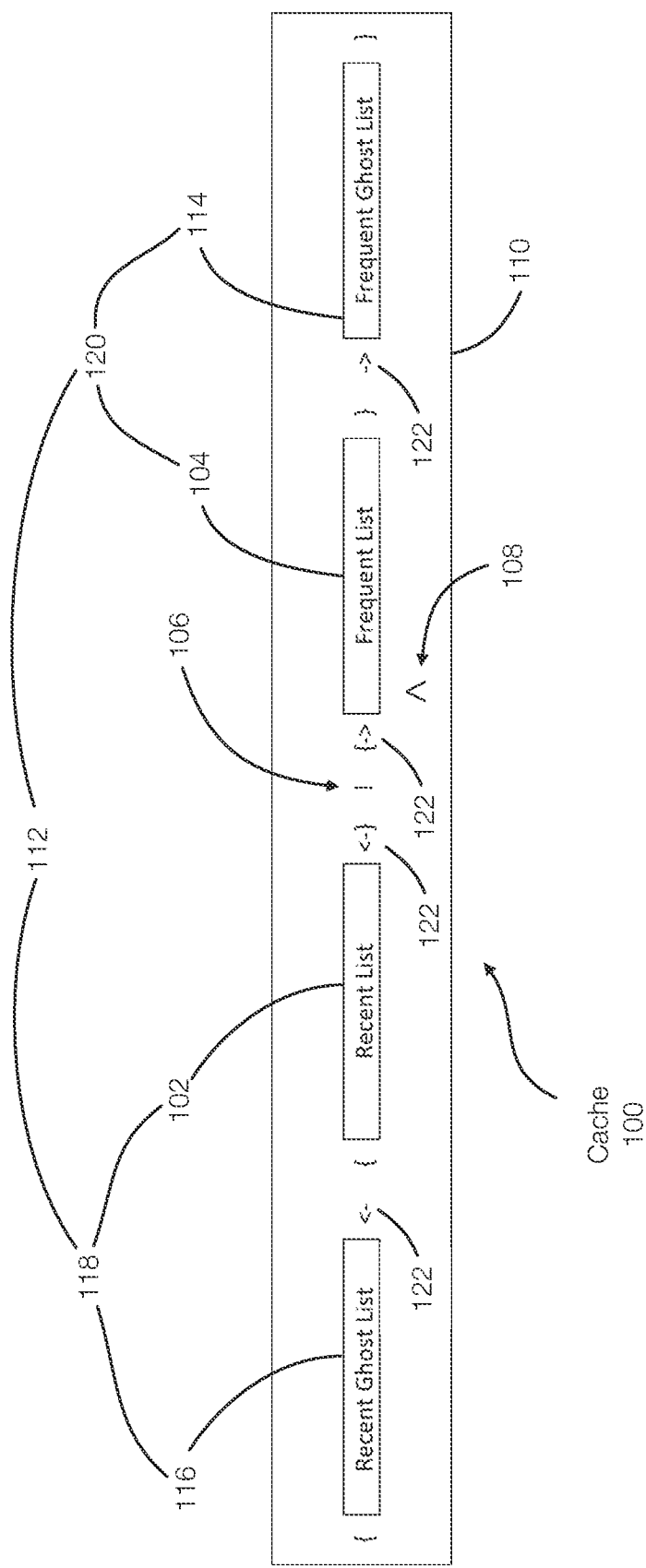
FIG. 1A discloses aspects of a cache such as an adaptive replacement cache.

FIG. 1A discloses aspects of an adaptive replacement cache. The adaptive replacement cache or cache 100 typically has a fixed size, represented by the box 110. The contents or data stored in the cache 100 is represented by an entry list 112, which includes, by way of example, recent entries 118 and frequent entries 120. The recent entries 118 include a recent list 102 and a recent ghost list 116. The frequent entries 120 include a frequent list 104 and a frequent ghost list 114. The recent list 102 and the recent ghost list 116 are typically configured to store or list entries with respect to recency. The frequent list 104 and the frequent ghost list 114 are configured to store or list entries in the cache 100 with respect to frequency and/or recency.

The top of the list 102 and the top of the list 104 are associated with a marker 106 (illustrated as an "!"). The marker 108 (illustrated as an "^"), represents a target size for the recent list 102 and/or the recent ghost list 116. In one example, the target size of the recent list 102 and/or the recent ghost list 116 may be larger than a target size of the frequent list 104 and/or the frequent ghost list 114. In effect, the marker 106 conveys the actual sizes of the lists 102 and 104 in the cache 100. As illustrated, the actual sizes of the lists 102, 116, 104, and 114 may differ from the target sizes. The relative sizes of the recent list 102, the recent ghost list 116, the frequent list 104, and/or the frequent ghost list 114 may change during operation of the cache 100.

As entries are added to and/or removed from the lists 102, 116, 104, and 114, their relative sizes may change. In other words, the marker 106 may move or change during operation of the cache 100. The marker 106 can reference a location or position relative to the entry list 112.

Entries in the recent list 102 are illustrated to the left of the marker 106. When an entry is added to the recent list 102, the entry is added at the top (e.g., next to the marker 106) and the remaining entries in the recent list 102 shift to the left (or away from the marker) as needed. Entries at the end or bottom of the recent list 102 are shifted into the recent ghost list 116. Over time, entries may be evicted from the recent ghost list 116.

Similarly, entries added to the frequent list 104 are added to the right of the marker 106 and the remaining entries in the frequent list 104 shift to the right as needed. Entries exiting the frequent list 104 enter the frequent ghost list 114. Eventually, entries in the frequent ghost list 114 are evicted.

The recent list 102 and the recent ghost list 116 operate much like an LRU (Least Recently Used) list. The recent list 102 and the recent ghost list 116 are for recent entries into the cache 100. Entries in the recent list 102 have been accessed a single time. The frequent list 104 and the frequent ghost list 114 are configured to store entries that have been accessed multiple times.

New entries to the cache 100 are added to the recent list 102 at the top and are gradually pushed to the left (in this visual example). Eventually, these entries are pushed into the recent ghost list 116 from the recent list 102 and then evicted from the recent ghost list 116. Similarly, entries to the frequent list 104 are added at the top of the frequent list 104. These entries move to the right into the frequent ghost list 114 and are eventually evicted from the cache 100.

In one example each of the lists 102, 116, 104, and 114 is substantially operated as a least recently/frequently used list. As previously stated, however, the frequent list 104 and the frequent ghost list 114 also account for frequency of access. In one example, the lists 102, 116, 104, and 114 (the entry list 112) are an example of a cache directory that identifies the data stored in the cache 110. These lists may, in another example, represent data.

Also, it is understood that the implementation of the entry list 112 may have no concept of direction but may be implemented using an appropriate data structure. Generally, the structure is configured such that the entries are arranged in a time-related and/or frequency manner. However, this structure or arrangement is not limiting, and other structures or list arrangements are within the scope of embodiments of the invention. The description of FIG. 1A aids in understanding the relationship between the cache size, entries in the cache, and the manner in which the entries are identified in the directory or entry list 112.

Figure 1B:
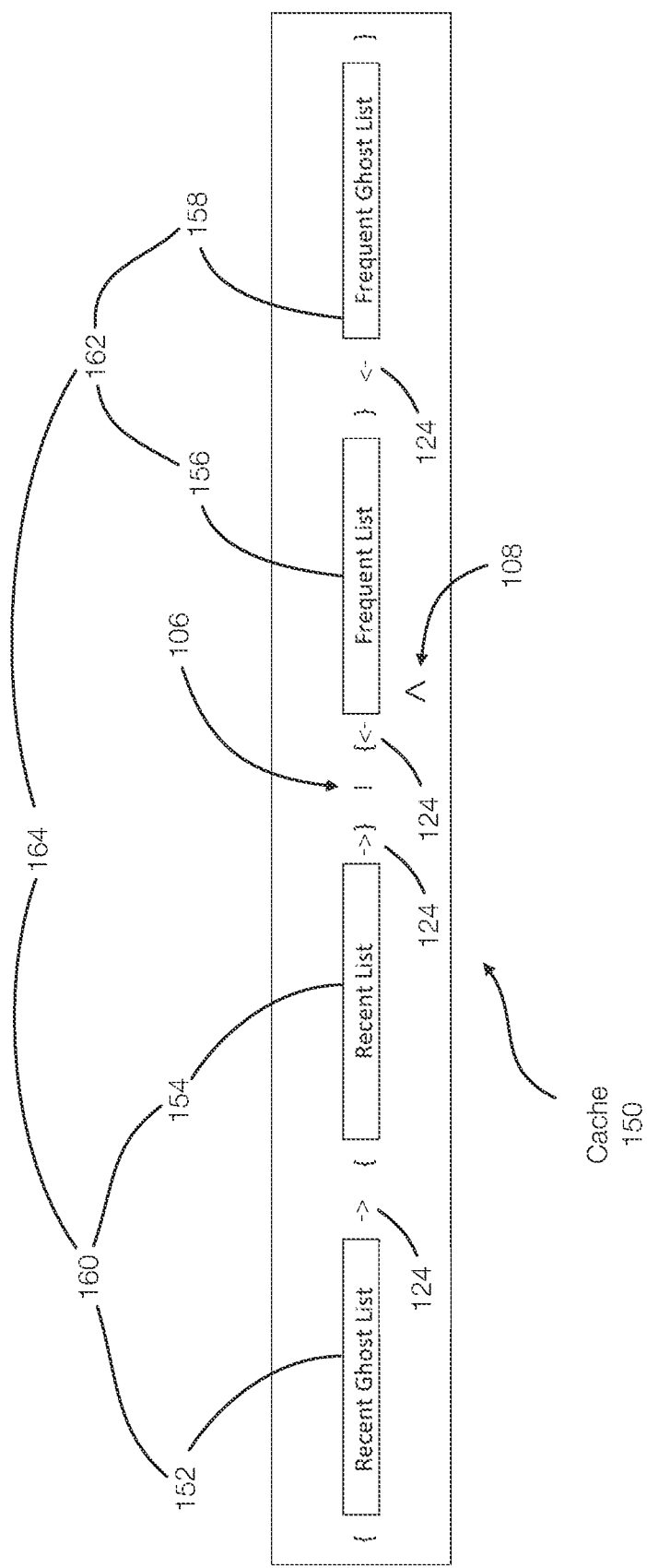
FIG. 1B discloses aspects of a reverse cache that may be used in conjunction with a main cache.

FIG. 1B illustrates an example of a reverse cache. Embodiments of the invention, more specifically, relate to a reverse cache or a reverse adaptive replacement cache. FIG. 1A may also represent a reverse cache by reversing the directions of the arrows 122 (see FIG. 1A) to the direction illustrated by the arrows 124 as illustrated in the cache 150 shown in FIG. 1B. A reverse cache uses the recency and frequency to identify data that can be inserted into the main cache. The reverse cache 150, in one example, is configured to identify data that should be added or promoted to a main cache. Because one example function of a reverse cache is to identify data to promote to the main cache, the reverse cache 150 may store data identifiers, index values, other entries or the like rather than the actual data.

Operation of the reverse cache may promote an entry to a main cache. When an entry is promoted, the main cache stores the actual data rather than the fingerprint of the data. The operation of the reverse cache 150 may also include a recent ghost list 152, a recent list 154, a frequent list 156, and a frequent ghost list 158. The recent entries 160 include the recent ghost list 152 and the recent list 154 and the frequent entries 162 include the frequent list 156 and the frequent ghost list 158. Thus, the entry list 164 includes the recent entries 160 and the frequent entries 162.

In one example, the reverse cache 150 stores a representation of data, a pointer to data, a unique data identifier, an index value or entry, or the like rather than storing actual data. Identifiers such as fingerprints (e.g., hashes of the data), index values or the like may be stored in the reverse cache.

For example, the recent list 154 and the frequent list 156 may store fingerprints of data. The recent ghost list 152 and the frequent ghost list 158 may store index values that, in effect, point to the fingerprints of the data. Storing fingerprints consumes less space than storing the corresponding data. Storing index values consumes less storage space than the fingerprints.

Figure 2:
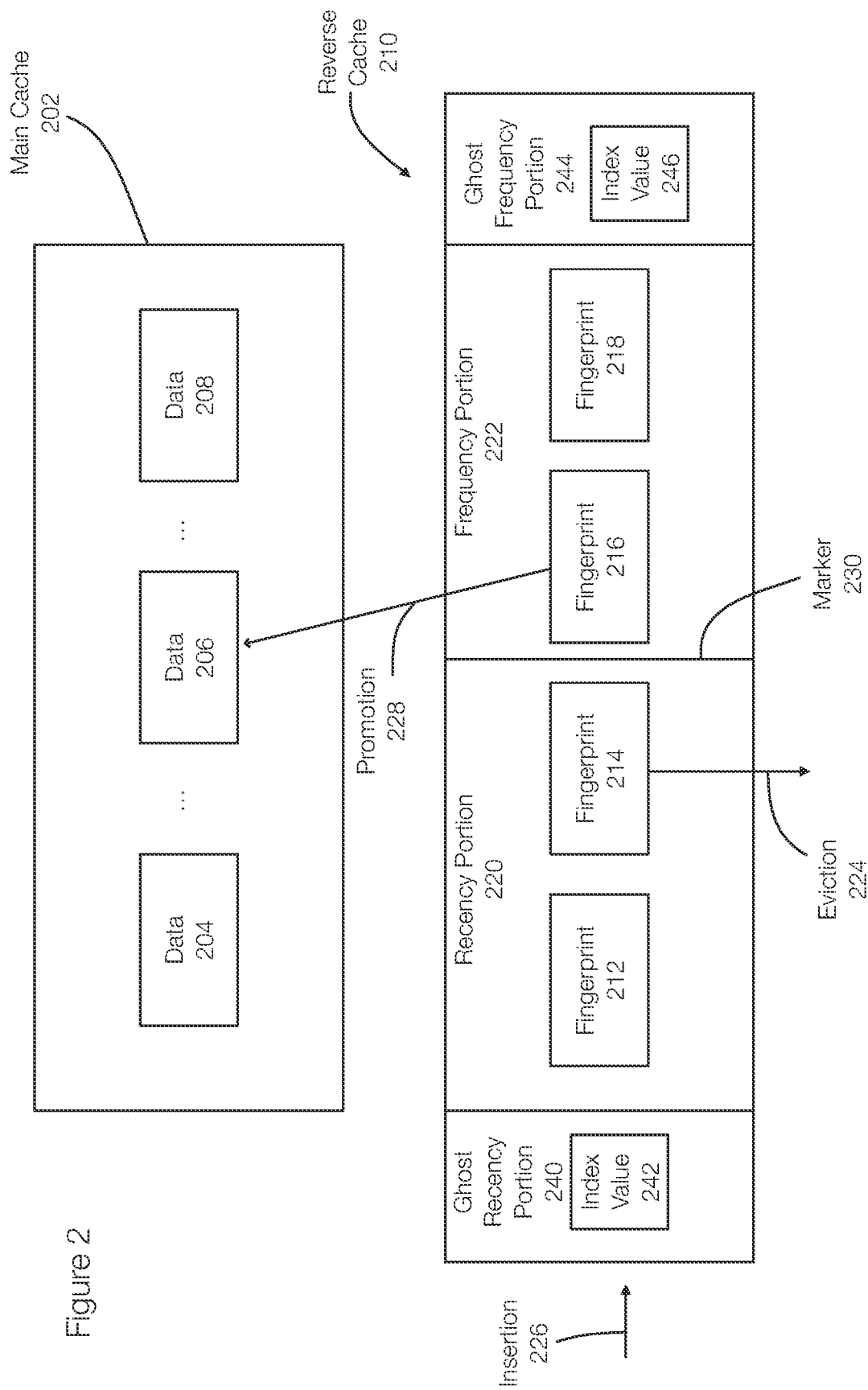
FIG. 2 discloses aspects of promoting entries from a reverse cache to a main cache and aspects of evicting entries from a reverse cache.

FIG. 2 discloses aspects of a reverse cache that is configured to identify data to promote to a main cache. The main cache 202 may be an adaptive replacement cache in one example or may use other methods to manage/evict data from the main cache 202. FIG. 2 illustrates a reverse cache 210 that is configured to cooperate with a main cache 202 that stores or caches data that may be used, for example, by an application. In this example, the reverse cache 210 is configured to identify data that can be stored in or promoted to the main cache 202. When data is identified by the reverse cache, the data is promoted to the main cache. In one example, data is promoted to the main cache 202 in an automatic manner or by operation of the reverse cache 210.

Generally, the reverse cache 210 identifies data that has been accessed multiple times. More specifically, operation of the reverse cache 210 tends to identify data that has been accessed multiple times and/or accessed recently. Data that has been accessed multiple times is a candidate for promotion to the main cache 202. In some examples, data must be accessed a threshold number of times prior to promotion to the main cache 202. In some examples, no threshold is required, and data is promoted by operation of the reverse cache 210 such that the data that has been accessed the most (compared to other entries in the reverse cache 210) or multiple times may be promoted to the main cache 202.

The main cache 202 and the reverse cache 210 may be implemented in the same memory such that the reverse cache 210 consumes a portion of memory along with the main cache 202. The reverse cache 210 and the main cache 202 may also be separate and may be managed separately. The main cache 202 and the reverse cache 210 are implemented in a memory that is typically faster (e.g., Random Access Memory (RAM)) than other memory such as a hard drive. The main cache 202 and/or the reverse cache 210 may be implemented as L1, L2, L3 memory or the like.

The main cache 202 stores data, represented by data 204, 206, and 208, and may be associated with a recent entries and/or frequent entries such as illustrated in FIG. 1B. The data 204, 206, and 208 may be blocks, chunks, files, or the like. The reverse cache 210, in one example embodiment, does not store the actual data, although this is not excluded by embodiments of the invention. In this example, the reverse cache 210 includes a recency portion 220 and a frequency portion 222 that store references to data, such as data fingerprints, which are represented by fingerprints 212, 214, 216, and 218. A fingerprint is an example of an identifier that may uniquely represent a block, chunk, file, or other data. A fingerprint may be a hash of the data. This allows the reverse cache 210 to be small compared to the main cache 202.

The ghost portion of the reverse cache 210, which includes the ghost recency portion 240 and the ghost frequency portion 244, may store index values, represented by the index values 242 and 246. The index values are typically smaller than fingerprints or other identifiers.

The fingerprints and index values stored in the reverse cache 210 may be referred to generally an entries in the reverse cache 210.

An example function of the reverse cache 210 is to identify data that may be promoted to the main cache 202 or to promote data to the main cache 202 based on the state of or operation of the reverse cache 210. The criteria may be to promote data once the data has been accessed a specified number of times. For example, the reverse cache 210 operates to determine that the fingerprint 216 satisfies the criteria and the corresponding data may be promoted to the main cache 202 as the data 206. Alternatively, operation of the reverse cache 210 may promote the fingerprint 216 regardless of the criteria if used. In some examples, the criteria may be flexible and may depend on the state of the reverse cache 210. As previously stated, the number of times data should be accessed, which is an example of the criteria, prior to promotion may be fixed or flexible.

For example, an entry may be promoted when the reverse cache 210 is full and a new entry (e.g., a new fingerprint) is inserted 226 into the reverse cache 210. Of course, the reverse cache 210 may elect to evict 224 an entry rather than promote an entry to the main cache 202. For example, if a particular entry most likely to be promoted to the main cache 202 has only been accessed a single time or less than a threshold number of times, the insertion 226 of a new entry may result in the eviction of the particular entry from the reverse cache 210 without the promotion of the particular entry.

When the fingerprint 216 satisfies the criteria or threshold for promotion, or by operation of the reverse cache 210 which, in effect, implements the criteria or implements a flexible criteria, the data corresponding to the fingerprint 206 is promoted to the main cache 202 as the data 206. Promoting the fingerprint 216 may also evict the fingerprint 216 from the reverse cache 210. In another example, a fingerprint, such as the fingerprint 214, may reach a point where the fingerprint 214 is evicted 224 from the reverse cache. In this example, the fingerprint 214 has only been accessed once and is at the end of the recency portion 220. This indicates that the fingerprint 214 is the oldest entry (at least with respect to recency) and is the least recently accessed. Thus, the insertion 226 of a new fingerprint or index value may result in the eviction 224 of the fingerprint 214.

This may depend on the state of the reverse cache 210 or other factors. For example, if the reverse cache 210 is full, adding a new entry results in the promotion of an entry or the eviction of an entry. In one example, the reverse cache 210 may operate to automatically promote an entry. Alternatively, the reverse cache 210 may implement a criteria. If the criteria is not satisfied, an entry is evicted to accommodate the new entry.

In one example embodiment, the reverse cache 210 may have a ghost recency portion 240, a recency portion 220, a frequency portion 222, and a ghost frequency portion 244. Entries are often promoted to the main cache 202 from the frequency portion 222 and evicted from the reverse cache 210 from the recency portion 220. Promotions and evictions, however, are not limited thereto.

More specifically, the ghost recency portion 240 and the recency portion 220 typically includes entries that have been accessed a single time. When an entry is inserted 226 into the reverse cache 210, the entry is inserted from the left into the ghost recency portion 240 as an index value 242 and entries in the ghost recency portion 240 and entries in the recency portion 220 are pushed to the right. At a certain point (e.g., reaching the marker 230), entries in the recency portion 220 are evicted 224.

As previously stated, the ghost recency portion 240 and the ghost frequency portion 244 store index values in one example. For example, a computing system (such as a data protection system) may store an index of fingerprints where each fingerprint identifies a data. The index i for entry $F_i$ in the fingerprint index F may be stored as the index value 242. When the index value 242 reaches the end of the ghost recency portion 240, the value is promoted to the recency portion 220 as a fingerprint.

If an entry in the ghost list recency portion 240 is accessed a second time, the entry is moved to the ghost frequency portion 244. For example, the index value 242 is in the ghost recency portion 240. When the data corresponding to the index value 242 is accessed a second time, the index value 242 may be moved to the ghost frequency portion 244 and enter the ghost frequency portion 244 from the right. This then causes entries in the ghost frequency portion 244 and the frequency portion 222 to move to the left and may result in the promotion 228 of an entry in the frequency portion 222 to the main cache 202.

If an entry in the recency portion 220 (now stored as a fingerprint) is accessed a second time, the entry is moved to the ghost frequency portion 244 as an index value. In this case, the fingerprint may be replaced with its index value. Alternatively, fingerprints in the recency portion 220 that are accessed a second time may be moved to the frequency portion 222 because they are already present in the reverse cache 210 as fingerprints. In either case, index values and fingerprints from the ghost recency portion and the recency portion 220 enter from the right sides of the frequency portion 222 or ghost frequency portion 244 in this visual example. In one example, the ghost frequency portion 244 may be omitted such that, when an entry in the ghost recency portion 240 is accessed a second time, the entry is promoted to a fingerprint and moved to the frequency portion 222.

Once an entry is in the frequency side of the reverse cache 210, the entry moves to the left and, at some point may be promoted 228 to the main cache 202 after reaching the marker 230. Entries in the ghost frequency portion 244 can also be evicted based on their position in the frequency portion 222 and/or the ghost frequency portion 244 and/or depending on their relationship to other entries that are in the frequency portion 222 and/or the ghost frequency portion 244, or the overall state of the reverse cache 210. If an entry has not been accessed for a period of time, the entry may be evicted.

Generally, however, new entries to the reverse cache 210 are inserted into the ghost recency portion 240 and make their way to the right where they are eventually evicted 224 unless moved to the frequency portion of the reverse cache, where they enter from the right into the ghost frequency portion 244 in this visual example.

Figure 3:
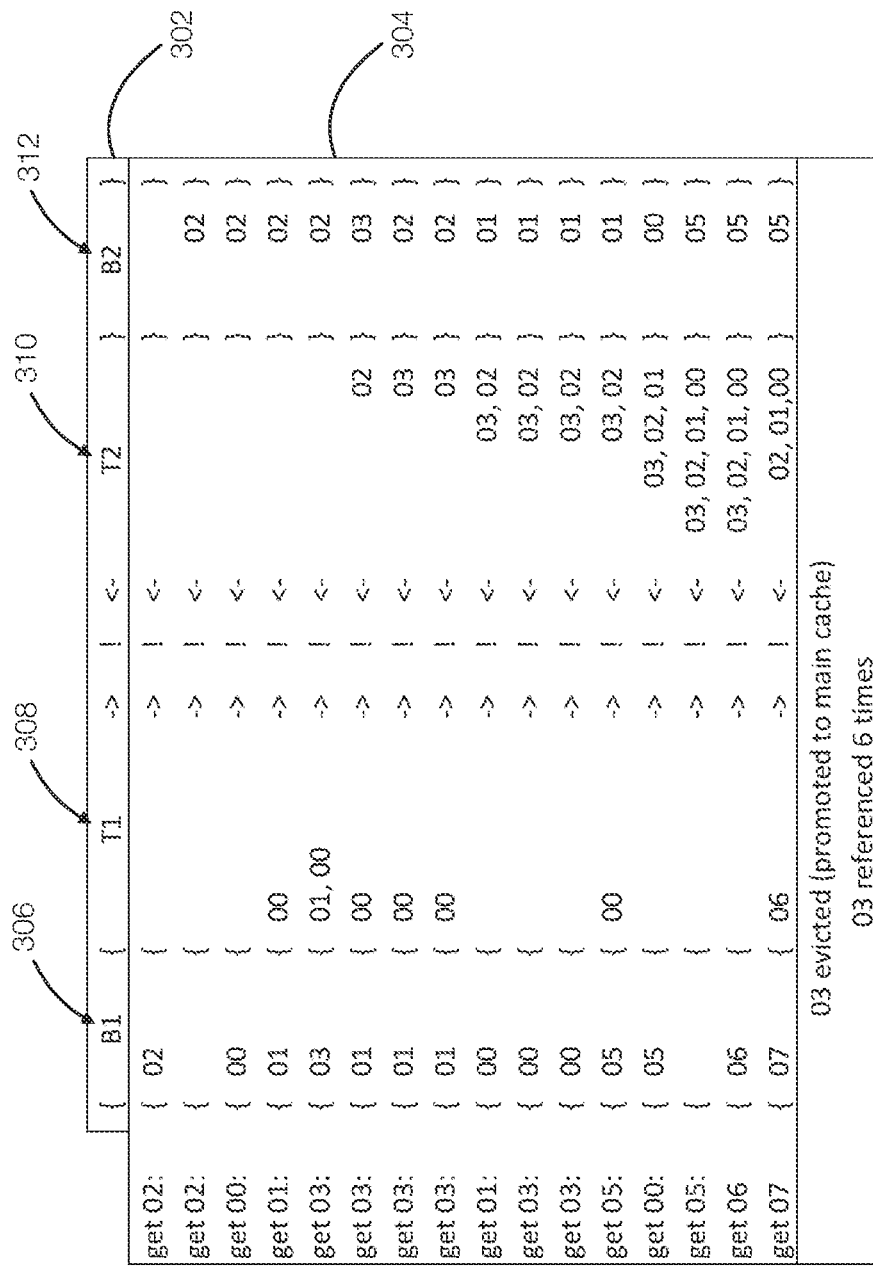
FIG. 3 discloses aspects of operating a reverse cache to promote entries to a main cache.

FIG. 3 discloses aspects of a reverse cache including the promotion of an entry in the reverse cache to a main cache. FIG. 3 illustrates a reverse cache 302. The reverse cache 302 includes a ghost recency or ghost recent list 406 (B1), a recency or recent list 308 (T1), a frequency list 310 (T2) and a ghost frequency list 312 (B2). The operations 304 include operations where entries are added to the cache 302 and illustrates how the entries move from the lists 306 and 308 to the lists 310 and 312.

The set of operations 304 illustrate how entries are entered and moved within the reverse cache 302. In this example, the reverse cache 302 can accommodate a total of 6 entries, but the size of the cache can be greater or lower and can be user determined or varied. In this example, the ghost lists 306 and 312 can accommodate one entry each. However, the sizes of the lists 306, 308, 310, and 312 may be flexible and adaptable. For example, if the first 6 entries are all only accessed once, none of these entries move to the frequency side of the reverse cache 302. Thus, the size of the ghosts recent list 306 may be 1 and the size of the recent list 308 may be 5 (thus using the full size of the reverse cache 302, which is 6 entries in this example. The size of the reverse cache 302 may also be dynamically changeable.

FIG. 3 is used to illustrate how a data may be cached in a reverse cache and promoted to a main cache. In this example, a data is 64 KB in size and is divided into 8 chunks or segments of 8 KB each. A fingerprint (e.g., a hash) is performed for each chunk or segments and this results in fingerprints 00, 01, 02, 03, 04, 05, 06, and 07. Each of these fingerprints corresponds to a chunk of the example data. As previously stated, the reverse cache 302 is configured to store fingerprints or other data identifiers, rather than the corresponding data. The size of each fingerprint is substantially smaller (e.g., 32 bytes) compared to the size of each chunk (8 KB in this example). Thus, the size of the reverse cache can be small compared to the space needed to store the actual chunks.

For convenience, fingerprints are used to represent entries in the cache. However, when a fingerprint is present in a ghost list, the indicator (e.g., 00, 01, . . . ) represents an index value rather than a full fingerprint.

Each of the operations in the operations 304 is described. For convenience in describing the operation of the reverse cache, each fingerprint or index value may be referred to as an entry in the reverse cache. However, each entry includes, in one example, at least an index value, a fingerprint or other data identifier. Each time a fingerprint is entered into the reverse cache or accessed, an access count for that fingerprint may be incremented. Thus, the cache 302 may also store some metadata. The following operations include get operations to retrieve data. In this example, the reverse cache 302 has a size of four (6) and can thus accommodate four entries at a time.

Get 02 causes 02 to be entered into the ghost recent list 306 as entry 02. As previously stated, the 02 may be an index value.

Get 02 moves the 02 entry from the ghost recent list 306 to the ghost frequency list 312. When an entry in the recency lists is accessed a second time, the entry moves from the recency lists to the frequency lists. In this example, the entry 02 moves from the ghost recent list 306 to the ghost frequency list 312. The 02 entry is still an index value in the ghost frequency list 312.

Get 00 enters the 00 into the ghost recent list 306 as entry 00. At this point, the entry 00 is an index value.

Get 01 enters the 01 into the ghost recent list 306 as entry 01 and shifts the 00 entry to the right. The 01 entry is an index value. The 00 entry, which is an index value, is replaced with a fingerprint of the data.

Get 03 enters the 03 into the ghost recent list 306 and shifts the 01 and 00 entries to the right. Both the 01 and 00 entries are stored as fingerprints because they are in the recent list 308 rather than the ghost recent list 306.

Get 03 moves the 03 entry from the ghost frequent list 306 to the ghost frequency list 312. Entry of the 03 entry into the ghost frequency list 312 as an index value shifts the 02 entry to the left. The 02 entry is replaced with a fingerprint when entering the frequency list 310.

Get 03 causes the 03 entry to advance in front of the 02 entry in the frequency list 312. The 02 entry is moved to the ghost frequency list 312 and is changed or replaced with an index value. The 03 entry is replaced with a fingerprint.

Get 03 causes no change in the reverse cache 312. However, an additional access may be recorded for the entry 03. At this stage, the 03 entry has been accessed 4 times.

Get 01 moves the 01 entry from the ghost recent list 306 to the ghost frequency list 312 and shifts the 03 and 02 entries to the left. At this point, the 00 entry returns to the ghost recent list 306. Thus, only the 00 entry is in the ghost recent list 306 because the other entries 01, 02, and 03 have been accessed more than once. The 02 entry is changed or replaced with a fingerprint.

Get 03 causes no change in the reverse cache 302. However, the 03 entry has been accessed 5 times.

Get 03 causes no change other than to note that the 03 entry has been accessed 6 times.

Get 05 causes 05 to be entered into the ghost recent list 306. The 00 entry is shifted to the right and enters the recent list 308. The 00 entry is replaced with a fingerprint.

Get 05 moves the 05 entry into the ghost frequency list 312. Thus, the frequency list 310 contains entries 03, 02, 01, and 00.

Get 06 places the 06 entry into the ghost recent list 306 as an index value.

At this point, the reverse cache 302 is full. The addition of another entry may cause an entry to be promoted or evicted from the reverse cache. Thus, an entry must be promoted or evicted in order to accommodate a new addition.

Get 07 moves the 07 entry into the ghost recent list 306. In this example, in order to insert the 07 entry into the reverse cache 302 as an index value, the 03 entry is promoted to the main cache. Thus, the actual data corresponding to the fingerprint 03 is inserted into the main cache and the 03 entry is removed from the reverse cache 302. As previously stated, inserting data into the main cache in this deliberate manner ensures that the main cache contains data that has been accessed multiple times and is more likely to be accessed going forward. This may improve the hit ratio of the main cache.

As previously stated, entries can be promoted to the main cache by operation of the cache. For example, when the reverse cache 302 is full and a new entry is added, the next candidate is promoted. However, it may also be possible to evict an entry instead. For example, if there is a requirement that an entry must be accessed 7 times prior to promotion to the main cache, get 07 may result in the eviction of entry 06 (which is the oldest recent entry and has only been accessed once) because the entry 03 has not been accessed 7 times (or other threshold value). Alternatively, the entry 05 from the ghost frequency list 312 may be evicted instead of the entry 06 because the entry 05 is an index value while the entry 06 is a fingerprint. Thus, there are various options when it is necessary to evict an entry from the reverse cache 302.

In this example, the 03 entry was promoted after being accessed 6 times. If another entry (e.g., 08) were added to the reverse cache, the entry 02, which has only been accessed twice, would be promoted to the main cache. This demonstrates, in one example, that the threshold for promoting entries to the main cache can vary and may occur based on operation of the cache. More specifically, making room for a new entry may simply promote the entry at the left of the frequency list 310 to the main cache.

If a hard threshold is in place, this could alternatively result in the eviction of an entry from the reverse cache 302.

For example, if a minimum number of accesses is 3, the entry 02 could not be promoted in this example and an eviction may be required. The eviction may occur from the recent list 308 (the oldest entry may be evicted) or from the ghost frequency list 312 (the entry with the fewest number of accesses may be evicted). However, the typical operation is to promote an entry in these examples.

Figure 4:
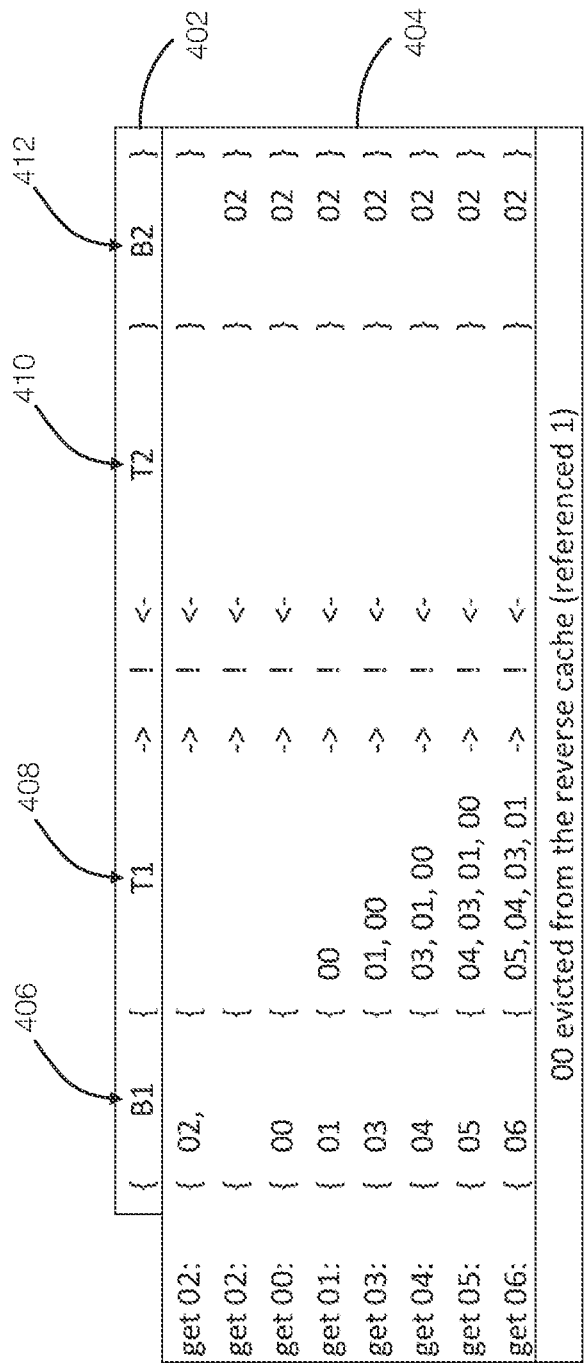
FIG. 4 discloses aspects of evicting entries from a reverse cache.

FIG. 4 discloses aspects of evicting an entry from a reverse cache. FIG. 4 illustrates example operations 404 in a reverse cache 402, which is an example of the reverse cache 302. The operations 404 are performed in a reverse cache configured to hold six entries in this example.

Each of the operations 404 is described.

Get 02 places 02 in the ghost recent list 406 as an index value.

Get 02: moves the entry 02 to the ghost frequency list 412.

Get 00 places 00 in the ghost recent list 406 as an index value.

Get 01 places 01 in the ghost list 406 as an index value and pushes the 00 entry to the right, where the index value is replaced with a fingerprint.

Get 03 places 03 in the ghost recent list 406 and pushes the entries 01 and 00 to the right.

Get 04 places 04 in the ghost recent list 406 and pushes the entries 03, 01, and 00 to the right in the recent list 408.

Get 05 places 05 in the ghost recent list 406 and pushes the entries 04, 03, 01, and 00 to the right in the recent list 408.

In this example no entries are present in the frequency list 410. However, the cache is full (6 entries are stored in the reverse cache 402).

Get 06 places 06 in the ghost recent list 406. The entry 01 is evicted from the reverse cache 402 without being promoted to the main cache. The entry 01 is the oldest entry in the recent side and has only been accessed once. Thus, the entry 01 is evicted.

In one embodiment, the reverse cache is a gating mechanism for adding or inserting data into a main cache. In one example, the reverse cache is configured such that only entries that are accessed more than once are promoted or entered into the main cache. An entry in the reverse cache for data that is accessed only once remains in the recency side and will eventually be evicted from the reverse cache as entries for more recently accessed data are added to the reverse cache. At the same time, entries accessed more than once are on a path to be promoted to the main cache.

Embodiments of a reverse cache, by incorporating ghost lists, allow the size of the reverse cache to be expanded while limiting the amount of memory required to implement the reverse cache.

Figure 5:
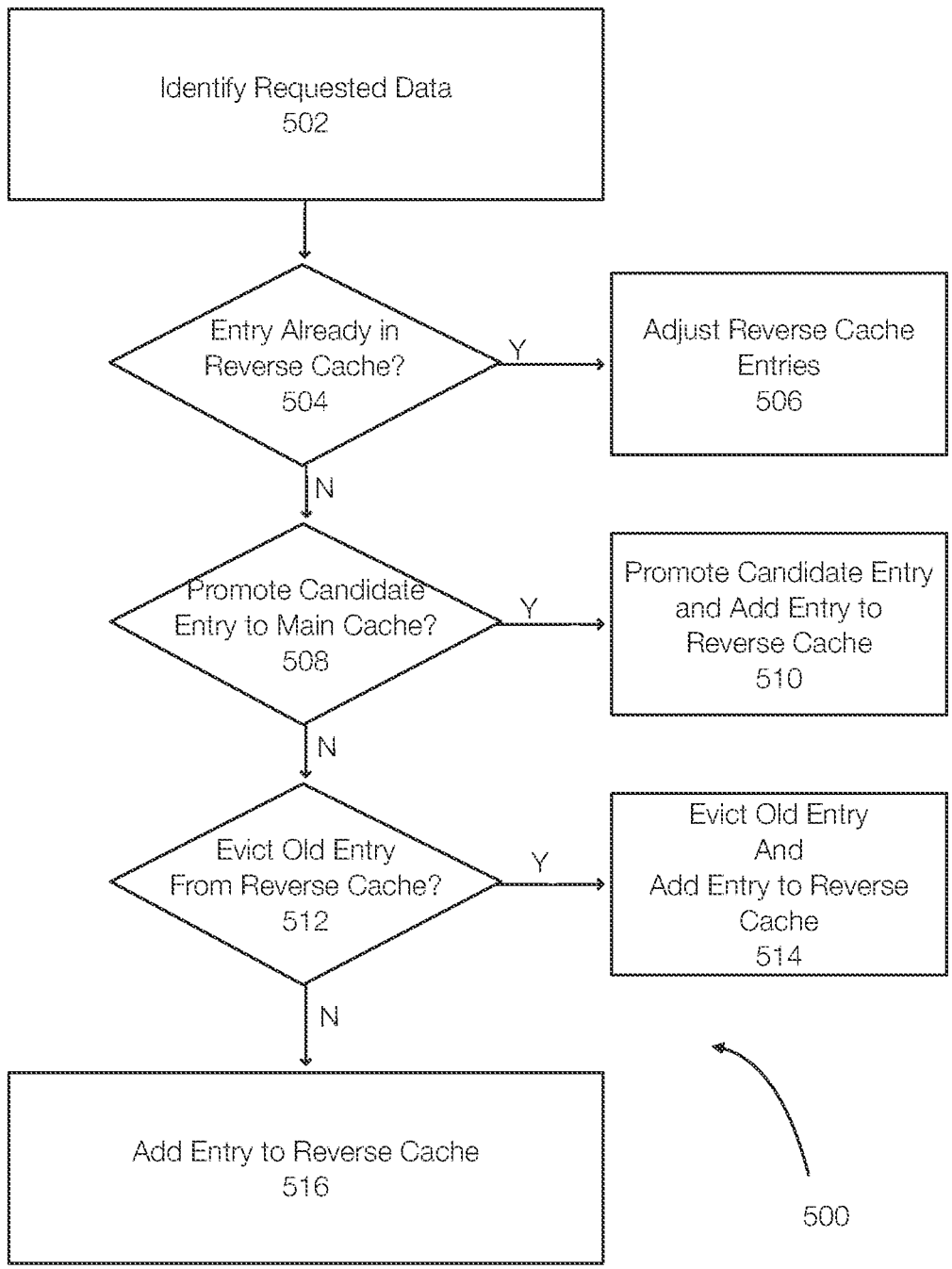
FIG. 5 discloses aspects operating a reverse cache.

FIG. 5 discloses aspects of inserting data to a cache using a gateway mechanism such as a reverse cache. In this example, data that has been requested is identified 502. An application, for example, may access data. In one example, the method 500 is performed after a determination is made that the requested data is not present in the main cache.

A determination is made as to whether the requested data (or fingerprint or index value thereof) is present 504 in the reverse cache 504. If the entry (e.g., the fingerprint or index value of the requested data) is present in the reverse cache (Y at 504), the entries in the cache are adjusted. For example, if the entry is in the recent side (either the ghost recent list or the recent list), the entry is moved to the frequent side. For example, the entry is moved into the ghost frequency list. If the entry is in the frequency side, the entry may be moved within the frequency list based on number of times accessed and/or time of access. The frequent list may be ordered based on number of times accessed and/or based on recency of access. Thus, moving an entry on the frequency side may or may not move the entry to the top of the list.

For example, assume that a first entry in the frequency list has been accessed 5 times and the next three entries in the frequency list has been accessed 3 times. If an entry that has been accessed 2 times is accessed a third time, the entry is moved to the second position ahead of the other entries that have been accessed three times (because of recency), but behind the entry that has been accessed 5 times. In another example, the entry is simply moved to the top of the frequency list regardless of how many times other entries have been accessed. This allows the reverse cache, when operating to promote an entry to the main cache, to account for both frequency and recency.

If the entry is not in the reverse cache (N at 504), a determination is made regarding whether there are candidates to promote 508 to the main cache. If there is a candidate (Y at 508), the candidate is promoted to the main cache and the current entry is added to the recency list of the reverse cache.

If there is no candidate to promote (N at 508), a determination is made regarding whether to evict 512 an old entry from the reverse cache. If there is an entry to evict (e.g., oldest entry in the recent list or least recently used entry in the ghost frequency list), the old entry is evicted from the reverse cache and the entry is added to the recent list of the reverse cache.

If there is no candidate to evict, the entry is added 516 to the ghost recent list of the reverse cache.

When promoting or evicting entries from the reverse cache, the promotion or eviction may occur in various circumstances. In one example, the decision occurs when the reverse cache is full and a new entry for the cache is received. Thus, in order to add the new entry to the reverse cache, it is necessary to make room for the new entry by evicting or promoting another entry.

Alternatively, the new entry can simply be added if there is room in the cache. However, entries can still be promoted even when the cache is not full based, by way of example, on an access threshold. When an entry is accessed a certain number of times (the threshold), the entry may be promoted regardless of whether the reverse cache is full or not.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, cache operations including cache eviction operations, least frequently used operations, frequency and/or recency-based operations, time threshold-based operations, or combination thereof. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general, however, the scope of the invention is not limited to any data backup platforms or data storage environments.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment. Cache operations may be implemented therein.

In addition to the cloud environment, the operating environment may also include one or more clients that are capable of collecting, modifying, and creating, data. These clients may use caches during these operations. As such, a particular client may employ, or otherwise be associated with, one or more instances of each of one or more applications that perform such operations with respect to data including cache related operations. Such clients may comprise physical machines, or virtual machines (VM) or containers.

Particularly, devices in the operating environment may take the form of software, physical machines, or VMs, or containers, or any combination of these, though no particular device implementation or configuration is required for any embodiment. Similarly, data protection system components such as databases, storage servers, As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: A method, comprising: identifying a request for a data, determining whether an entry for the requested data is present in a reverse cache, adding the entry for the requested data to the reverse cache as a ghost entry in the reverse cache when the entry is not present in the reverse cache, wherein the entry is adjusted in the reverse cache when the entry is present in the reverse cache, and promoting a candidate entry from the reverse cache to a main cache.

Embodiment 2. The method of embodiment 1, wherein the reverse cache comprises a ghost recent list, a recent list, a frequent list, and a ghost frequent list, further comprising, when the entry is present in the reverse cache, moving the entry to the ghost frequent list when the entry is in the recent list or in the ghost recent list.

Embodiment 3. The method of embodiment 1 and/or 2, wherein the entry comprises an index value when the entry is present in the ghost recent list or in the ghost frequent list and wherein the entry comprises a fingerprint when the entry is present in the recent list or in the frequent list.

Embodiment 4. The method of embodiment 1, 2, and/or 3, wherein the recent list and the ghost recent list includes entries that have been accessed a single time and wherein the frequent list and the ghost frequent list includes entries that have been accessed more than once.

Embodiment 5. The method of embodiment 1, 2, 3, and/or 4, further comprising, when the entry is present in the frequent list or the ghost frequent list, adjusting a position of the entry in the frequent list when the entry is in the frequent list.

Embodiment 6. The method of embodiment 1, 2, 3, 4, and/or 5, wherein the candidate entry has been accessed more than once and is in the frequent list or the ghost frequent list.

Embodiment 7. The method of embodiment 1, 2, 3, 4, 5, and/or 6, further comprising inserting data corresponding to the candidate entry into the main cache.

Embodiment 8. The method of embodiment 1, 2, 3, 4, 5, 6, and/or 7, further comprising evicting an old entry from the recent without adding data corresponding to the old entry to the main cache.

Embodiment 9. The method of embodiment 1, 2, 3, 4, 5, 6, 7, and/or 8, wherein the old entry is an oldest entry in a recent list and has only been accessed once.

Embodiment 10. The method of embodiment 1, 2, 3, 4, 5, 6, 7, 8, and/or 9, further comprising setting a threshold value of access times, wherein the candidate entry is promoted when a number of accesses of the candidate entry satisfies the threshold value or when promotion is needed to add the entry to the reverse cache.

Embodiment 11. The method of embodiment 1, 2, 3, 4, 5, 6, 7, 8, 9, and/or 10, further comprising identifying the candidate entry, wherein the candidate entry is at a top of the frequent list.

Embodiment 12. A method for performing any of the operations, methods, or processes, or any portion of any of these, or any combination thereof disclosed herein.

Embodiment 13. A non-transitory storage medium having stored therein instructions that are executable by one or more hardware processors to perform operations comprising the operations of any one or more of embodiments 1 through 13.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' or 'engine' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

With reference briefly now to FIG. 6, any one or more of the entities disclosed, or implied, by the Figures, and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random-access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid-state device (SSD) storage. As well, one or more applications 614 may be provided that comprise instructions executable by one or more hardware processors 606 to perform any of the operations, or portions thereof, disclosed herein. One or more of the memory components 602 may include one or more caches. The caches may include multiple levels of caches.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   identifying a request for a data;
   determining whether an entry for the requested data is present in a reverse cache, wherein the reverse cache is configured to store data identifiers and includes a ghost recent list, a recent list, a frequent list, and a ghost frequent list;
   adding the entry for the requested data to the reverse cache as a ghost entry in the reverse cache in a case where the entry is not present in the reverse cache, wherein the entry is adjusted in the reverse cache when the entry is present in the reverse cache;

moving the entry to the ghost frequent list when the entry is in the recent list or in the ghost recent list in a case where the entry is present in the reverse cache; and promoting a candidate entry from the reverse cache to a main cache, wherein the main cache is configured to store the data.

2. The method of claim 1, wherein the entry comprises an index value in a case where the entry is present in the ghost recent list or in the ghost frequent list and wherein the entry comprises a fingerprint when the entry is present in the recent list or in the frequent list.

3. The method of claim 2, further comprising identifying the candidate entry, wherein the candidate entry is at a top of the frequent list.

4. The method of claim 2, wherein the recent list and the ghost recent list includes entries that have been accessed a single time and wherein the frequent list and the ghost frequent list includes entries that have been accessed more than once.

5. The method of claim 4, further comprising, in a case where the entry is present in the frequent list or the ghost frequent list, adjusting a position of the entry in the frequent list when the entry is in the frequent list.

6. The method of claim 1, wherein the candidate entry has been accessed more than once and is in the frequent list or the ghost frequent list.

7. The method of claim 6, further comprising inserting data corresponding to the candidate entry into the main cache.

8. The method of claim 1, further comprising evicting an old entry from the reverse cache without adding data corresponding to the old entry to the main cache.

9. The method of claim 8, wherein the old entry is an oldest entry in the recent list and has only been accessed once.

10. The method of claim 1, further comprising setting a threshold value of access times, wherein the candidate entry is promoted when a number of accesses of the candidate entry satisfies the threshold value or in a case where promotion is needed to add the entry to the reverse cache.

11. A non-transitory storage medium having stored therein instructions that are executable by one or more hardware processors to perform operations comprising:

identifying a request for a data;

determining whether an entry for the requested data is present in a reverse cache, wherein the reverse cache is configured to store data identifiers and includes a ghost recent list, a recent list, a frequent list, and a ghost frequent list;

adding the entry for the requested data to the reverse cache as a ghost entry in the reverse cache in a case where the entry is not present in the reverse cache, wherein the entry is adjusted in the reverse cache when the entry is present in the reverse cache;

moving the entry to the ghost frequent list when the entry is in the recent list or in the ghost recent list in a case where the entry is present in the reverse cache; and promoting a candidate entry from the reverse cache to a main cache, wherein the main cache is configured to store the data.

12. The non-transitory storage medium of claim 11, wherein the entry comprises an index value in a case where the entry is present in the ghost recent list or in the ghost frequent list and wherein the entry comprises a fingerprint when the entry is present in the recent list or in the frequent list.

13. The non-transitory storage medium of claim 12, wherein the recent list and the ghost recent list includes entries that have been accessed a single time and wherein the frequent list and the ghost frequent list includes entries that have been accessed more than once.

14. The non-transitory storage medium of claim 13, further comprising, in a case where the entry is present in the frequent list or the ghost frequent list, adjusting a position of the entry in the frequent list when the entry is in the frequent list.

15. The non-transitory storage medium of claim 11, wherein the candidate entry has been accessed more than once and is in the frequent list or the ghost frequent list.

16. The non-transitory storage medium of claim 15, further comprising inserting data corresponding to the candidate entry into the main cache.

17. The non-transitory storage medium of claim 11, further comprising evicting an old entry from the reverse cache without adding data corresponding to the old entry to the main cache.

18. The non-transitory storage medium of claim 11, further comprising setting a threshold value of access times, wherein the candidate entry is promoted in a case where a number of accesses of the candidate entry satisfies the threshold value or when promotion is needed to add the entry to the reverse cache.

\* \* \* \* \*